INVENTORS
ARTHUR TILLMAN SHERMAN
ROBERT HARRISON MILLER
BY
ATTORNEY

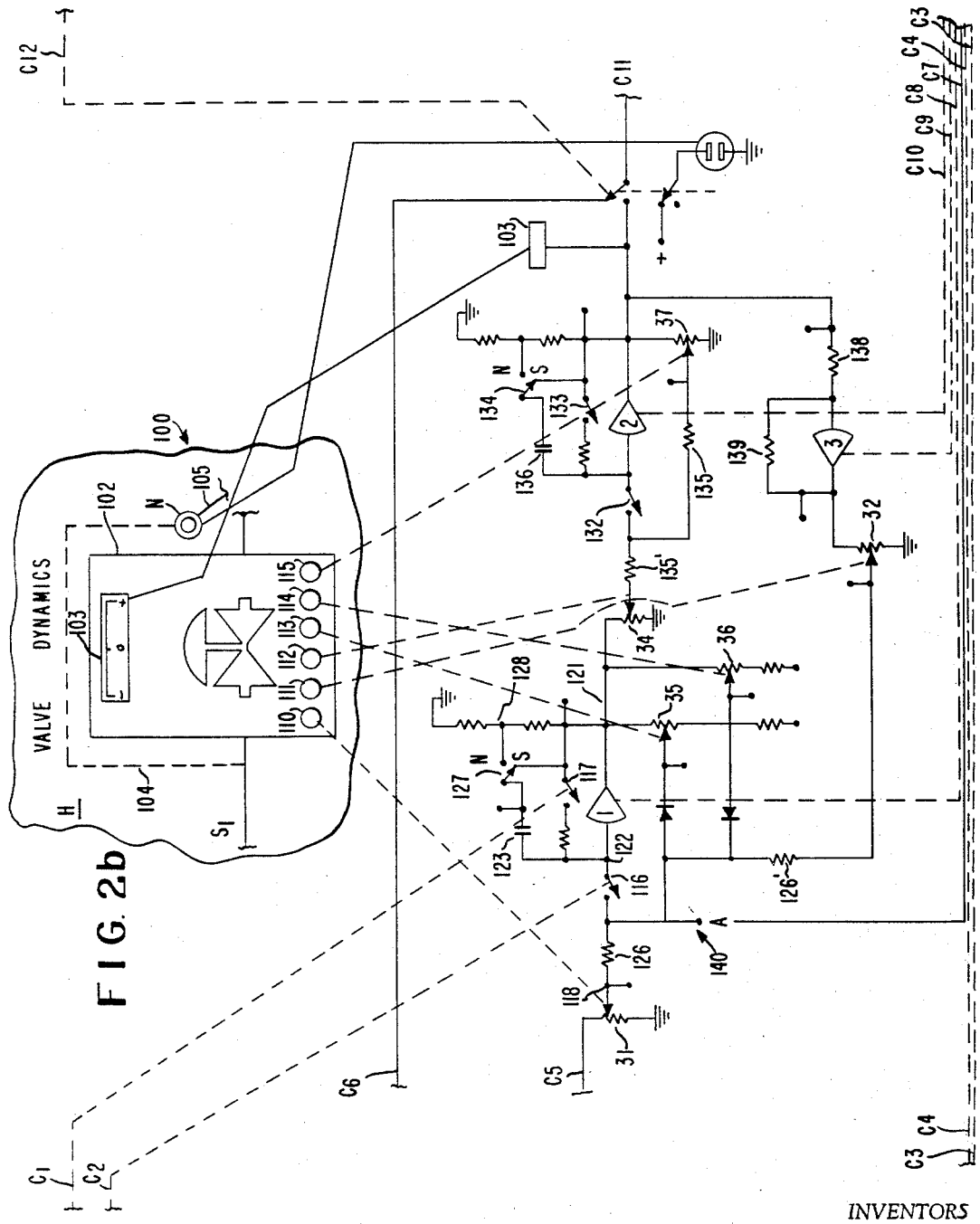

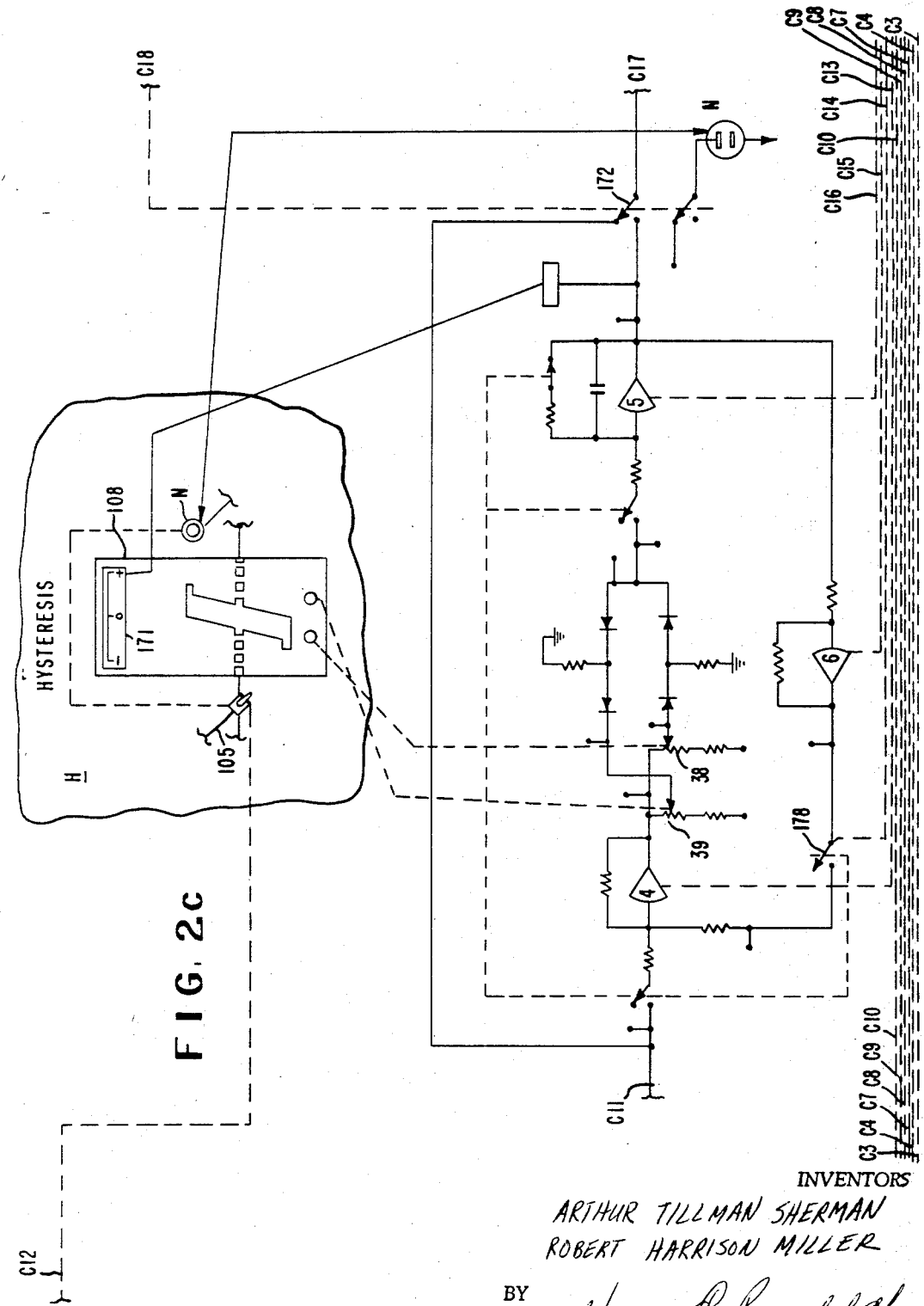

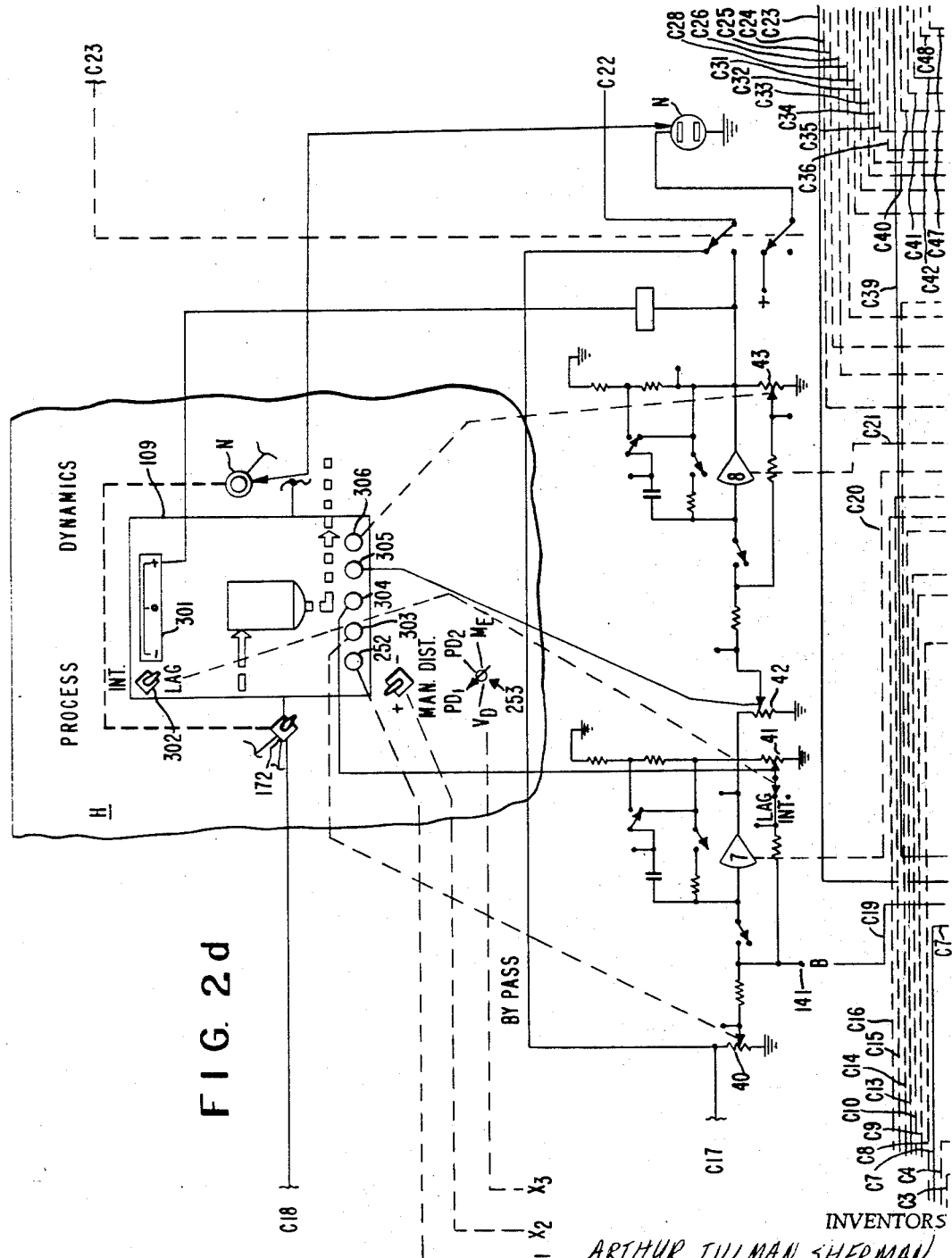

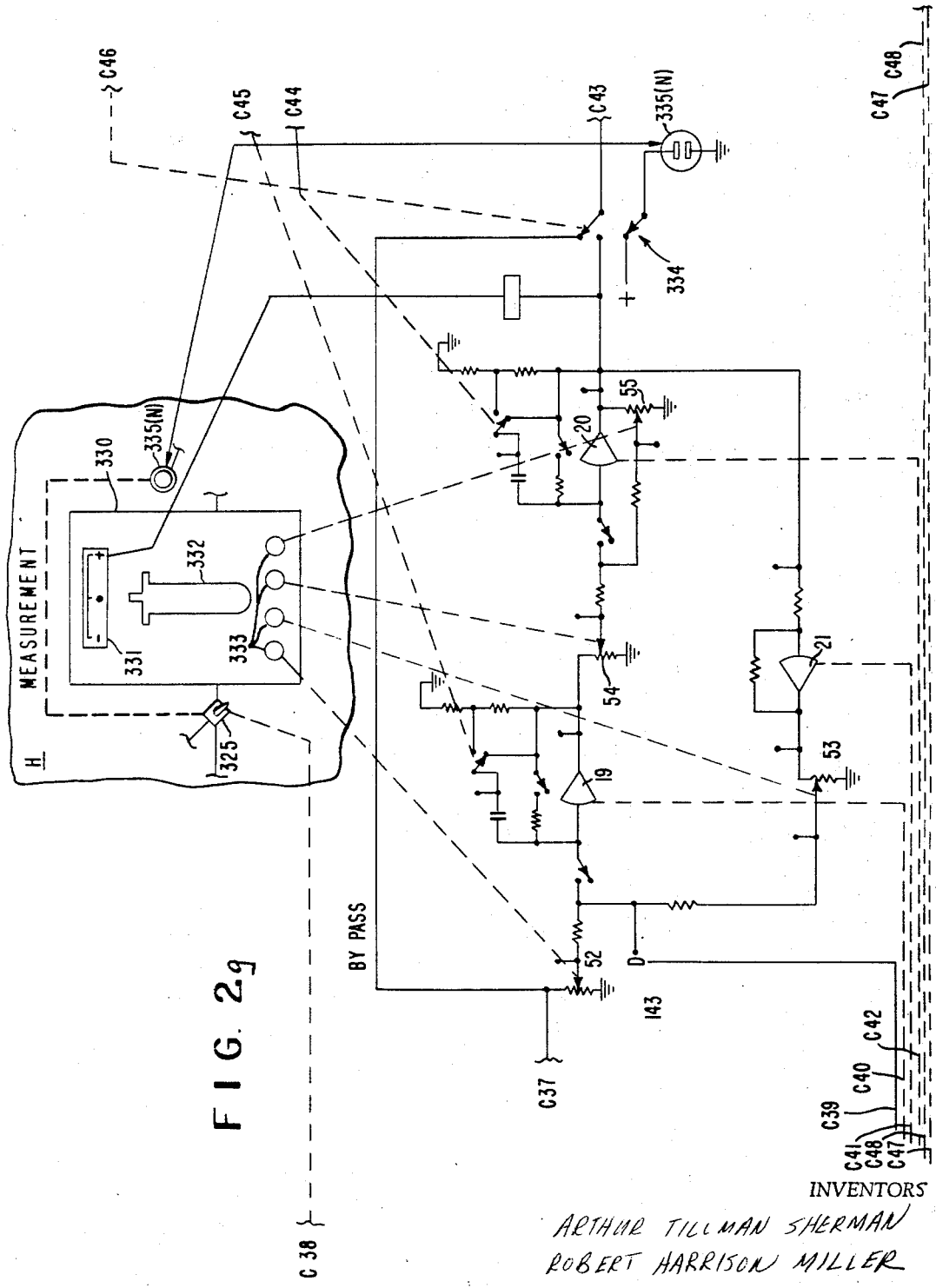

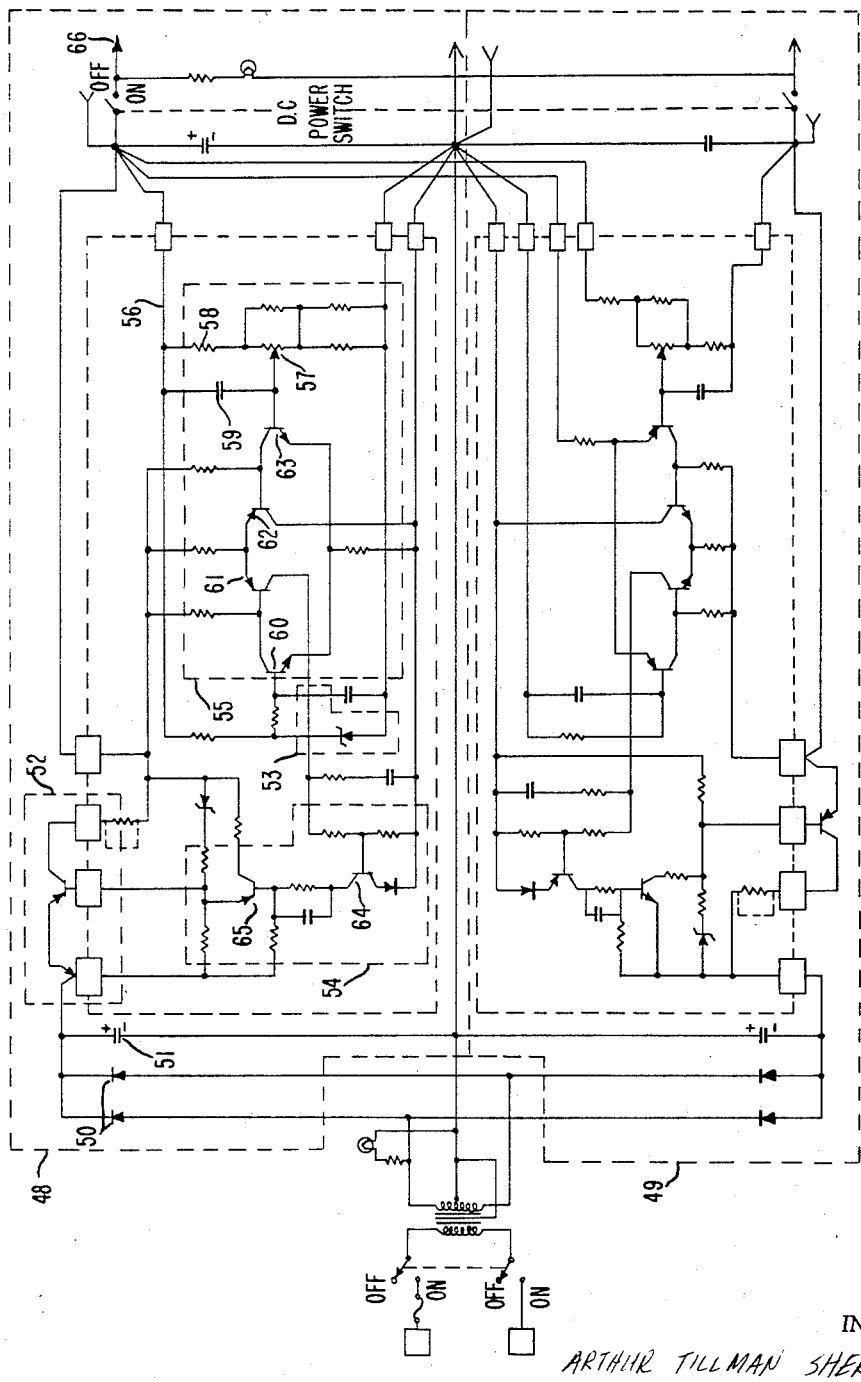

Jan. 14, 1969    A. T. SHERMAN ET AL    3,421,232
GROUP TRAINING AND EDUCATIONAL APPARATUS
Filed June 29, 1965
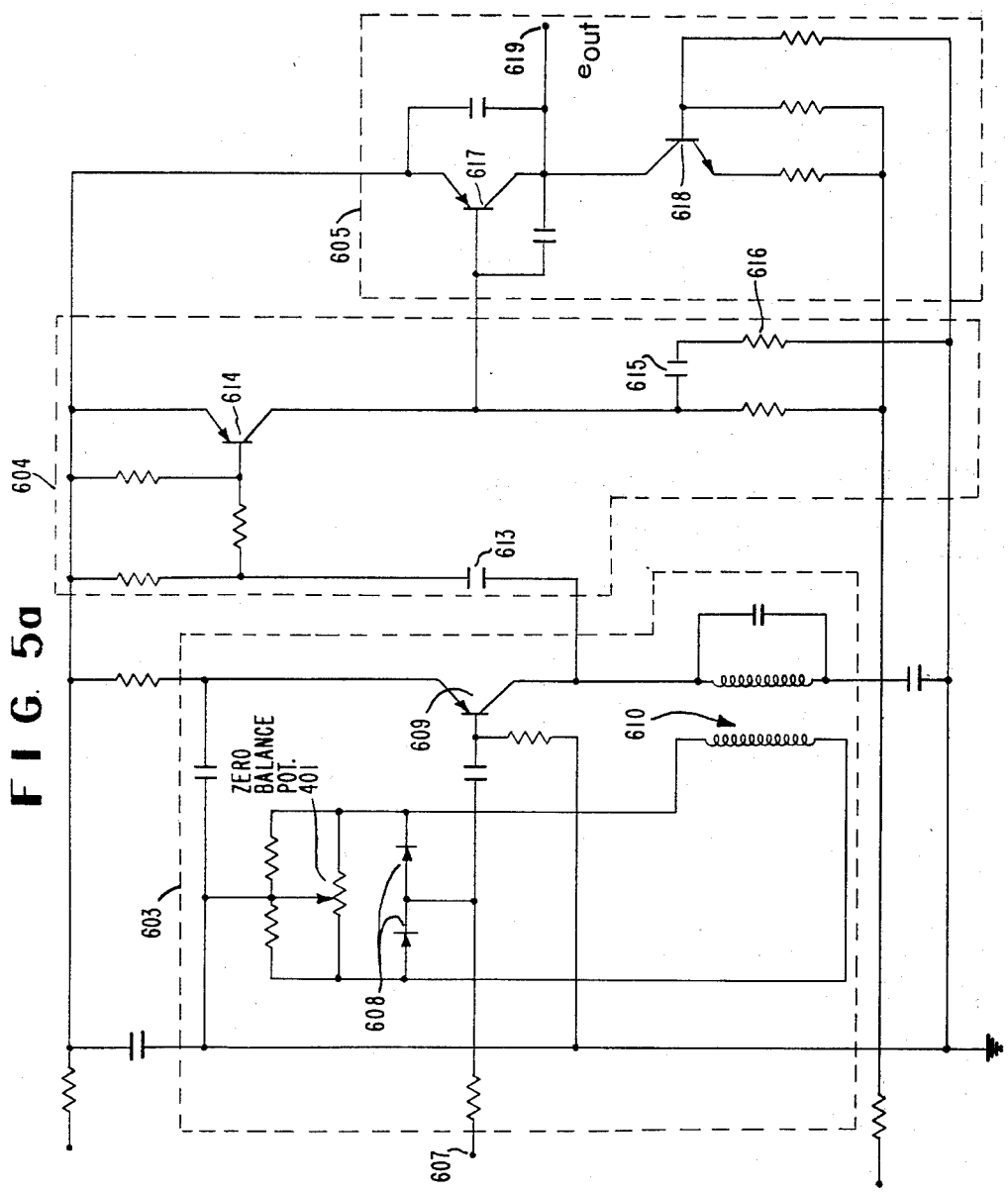
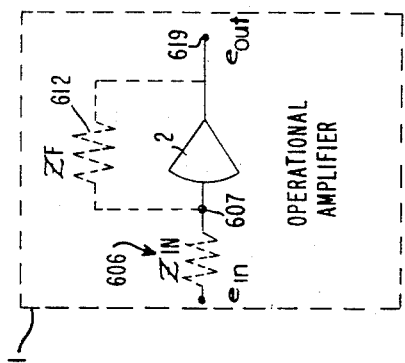
INVENTORS
ARTHUR TILLMAN SHERMAN
ROBERT HARRISON MILLER
BY
Harry E. Braddock
ATTORNEY

United States Patent Office 3,421,232
Patented Jan. 14, 1969

3,421,232
GROUP TRAINING AND EDUCATIONAL APPARATUS
Arthur Tillman Sherman, Swedesboro, N.J., and Robert Harrison Miller, Newark, Del., assignors to E. I. du Pont de Nemours and Company, Wilmington, Del., a corporation of Delaware
Filed June 29, 1965, Ser. No. 467,972
U.S. Cl. 35—13                                           2 Claims
Int. Cl. G09b 25/02

ABSTRACT OF THE DISCLOSURE

A compact lightweight plural-section process-simulating group training and educational apparatus with a selectively variable, selectively disconnectable independent computing section for each variable of each component of the process being simulated, the apparatus comprising a housing provided with means for connection to a suitable power supply and the housing provided with means for selective connection to one of a variety of automatic controller devices to form a control loop, the housing further provided with an enlarged accurate visual representation of the process being simulated and for each variable of the process, each representation comprising visual indicating means operatively connected to a computing section to provide instantaneous indications of the action of the simulated process, the apparatus provided with means for stopping, running, and rerunning any simulation at selectively varied rates.

---

Figure 1:
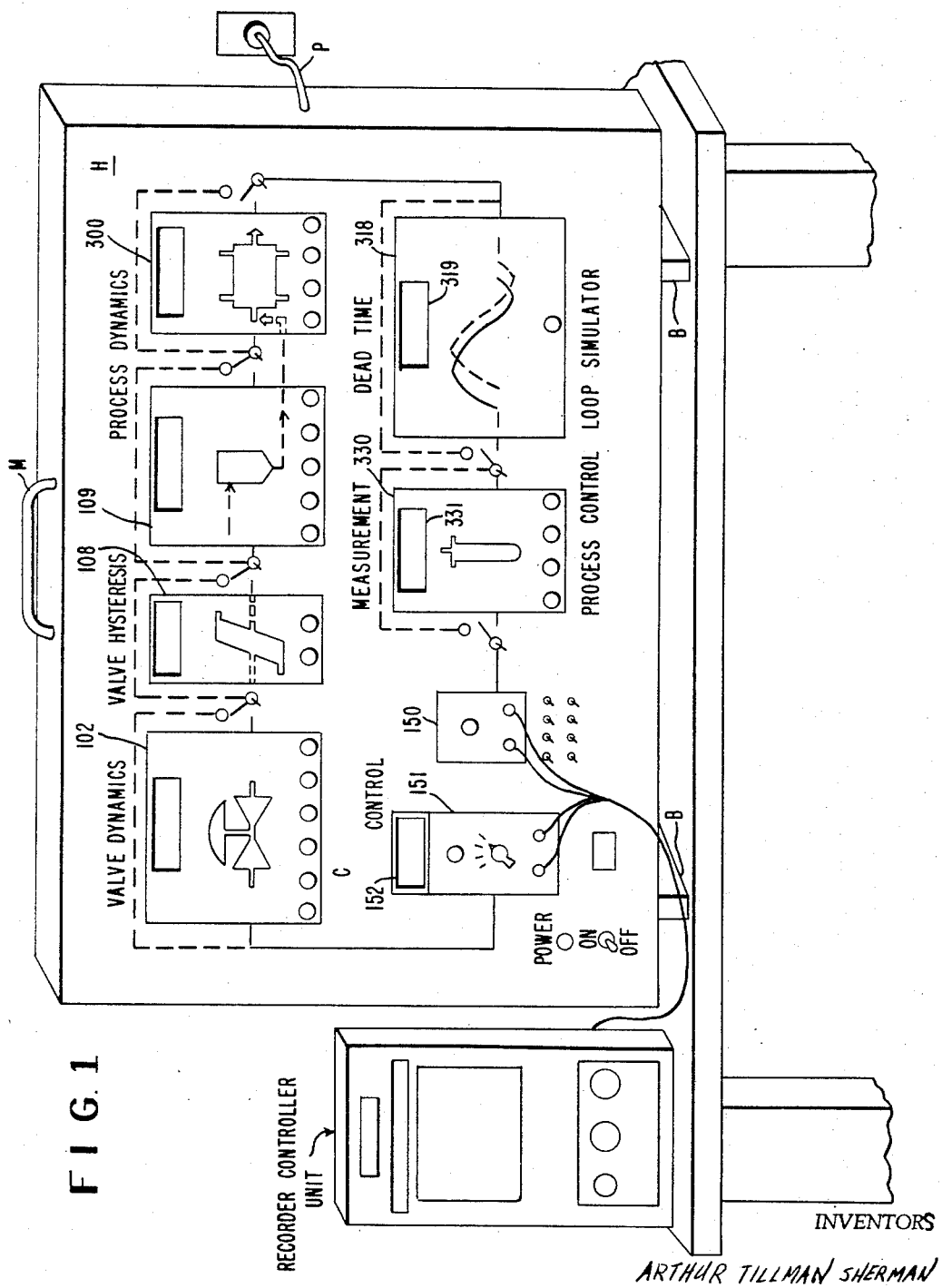

This invention relates generally to an improvement in the field of group training and group teaching. More specifically, the invention involves an apparatus for simulating automatically controlled industrial processes in a manner especially well adapted for group training and education of operating and maintenance personnel.

Various forms of apparatus have been developed according to the prior art for simulating automatically controlled processes. Most of these prior art apparatuses have represented general arrangements for analysis and study of either the process or its automatic control system, without features or provision for accomplishing, or facilitating, group training or group education of personnel such as those who would be involved in operating the process being simulated and/or maintaining its control system.

It is a major object of this invention to provide an improved electrical apparatus for simulating automatically controlled industrial processes, which apparatus comprises the features, missing in the prior art arrangements, for accomplishing and facilitating group training and group education of those who would be involved with the operation and for maintenance of the automatically controlled process being simulated.

It is a further object to provide such an improved electrical apparatus which is also compact, light-weight, portable, and capable of operating from available conventional power supply outlets and capable of operating in cooperation with a number of conventional automatic process control systems.

It is a further object to provide such an improved apparatus which is reasonably simple and economical to fabricate, operate, and maintain, yet effective, rugged, flexible, and reliable in operation.

The objects of the invention are achieved in an improved electrical group training apparatus for simulating an automatically controlled industrial process, which apparatus generally comprises a plurality of cooperating, operatively associated, selectively variable, selectively disconnectable, independent electrical computing, or simulating, components, one corresponding to each significant variable of each significant component of the process being simulated, the apparatus further comprising a housing provided with means for connecting said components to a suitable power supply, the housing further provided with a means for selective connection to one of a variety of automatic process control systems to form, with said computor components, or open and/or closed loop, said housing being further provided on its exteriors with an enlarged accurate visual representation of the process being simulated, of each significant variable of the process, and of the automatic process control system; each representation comprising visual indicating means operatively connected to a computing component or the automatic process control system to provide easily visible instantaneous indications of the action of the simulated automatically controlled process, said apparatus further comprising electrical means cooperating with said computing components and said automatic process control system, for selectively stopping, running, and rerunning any simulation at selectively varied rates.

Figure 2A:
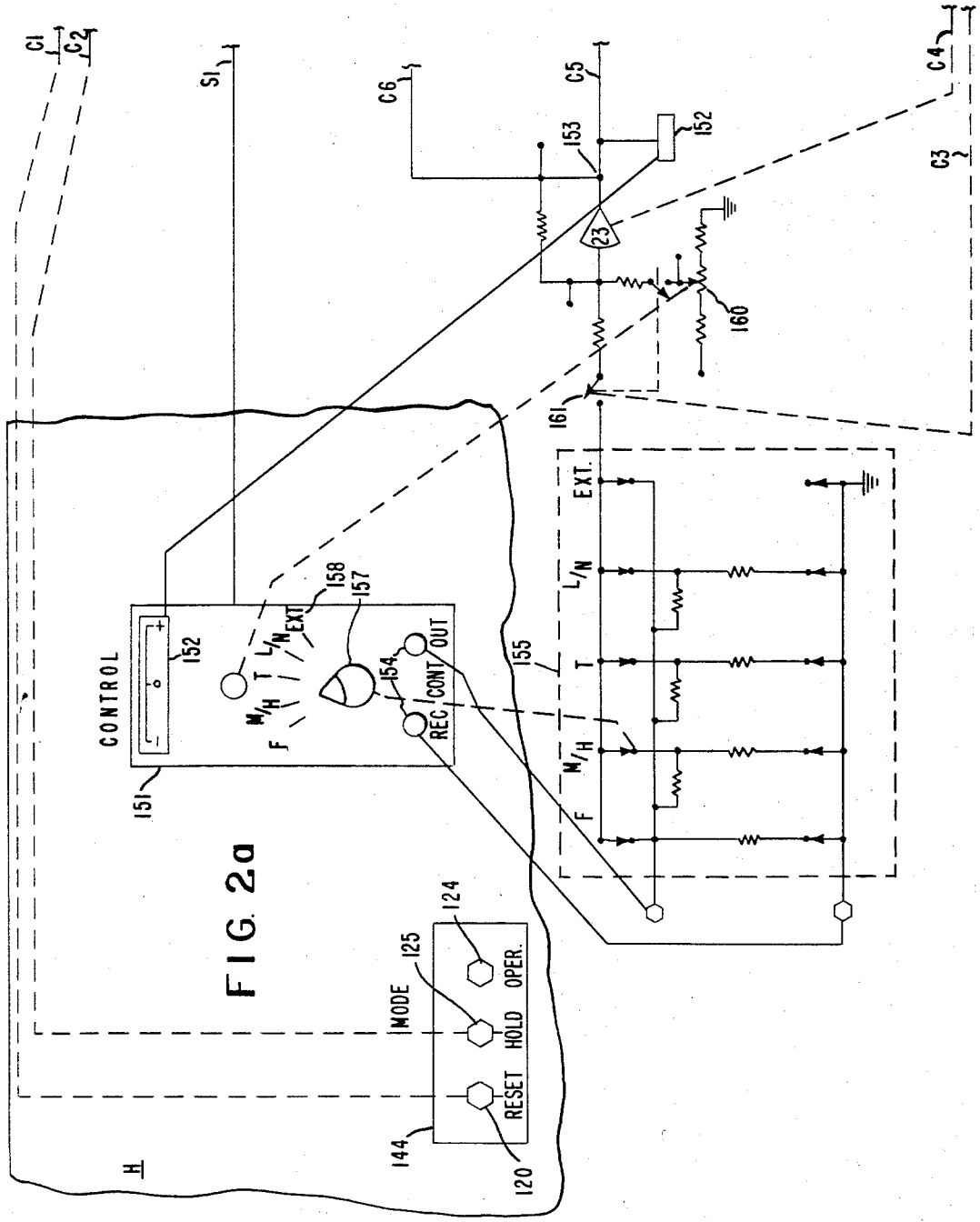
Figure 2E:
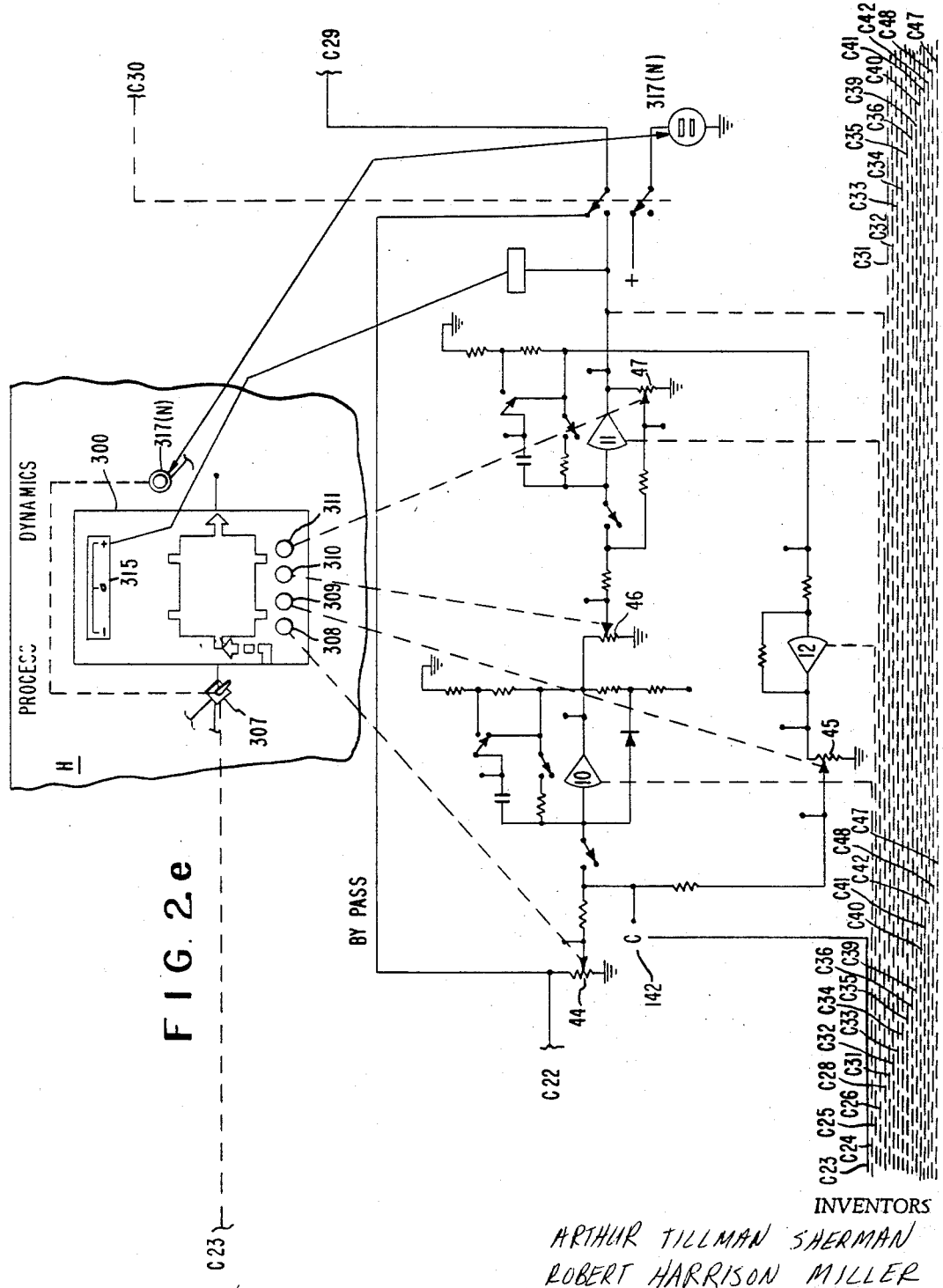
Figure 2F:
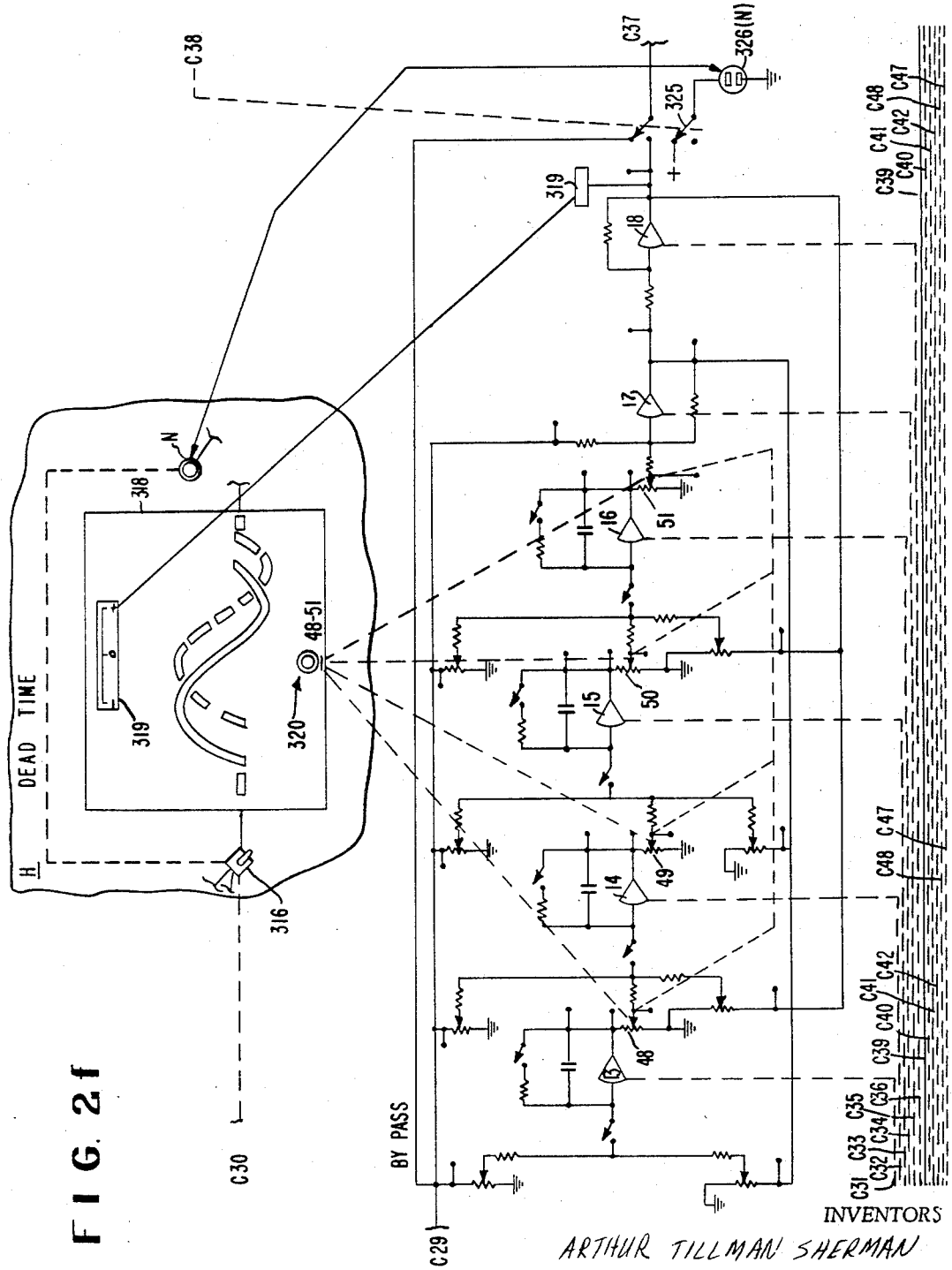
Figure 2H:
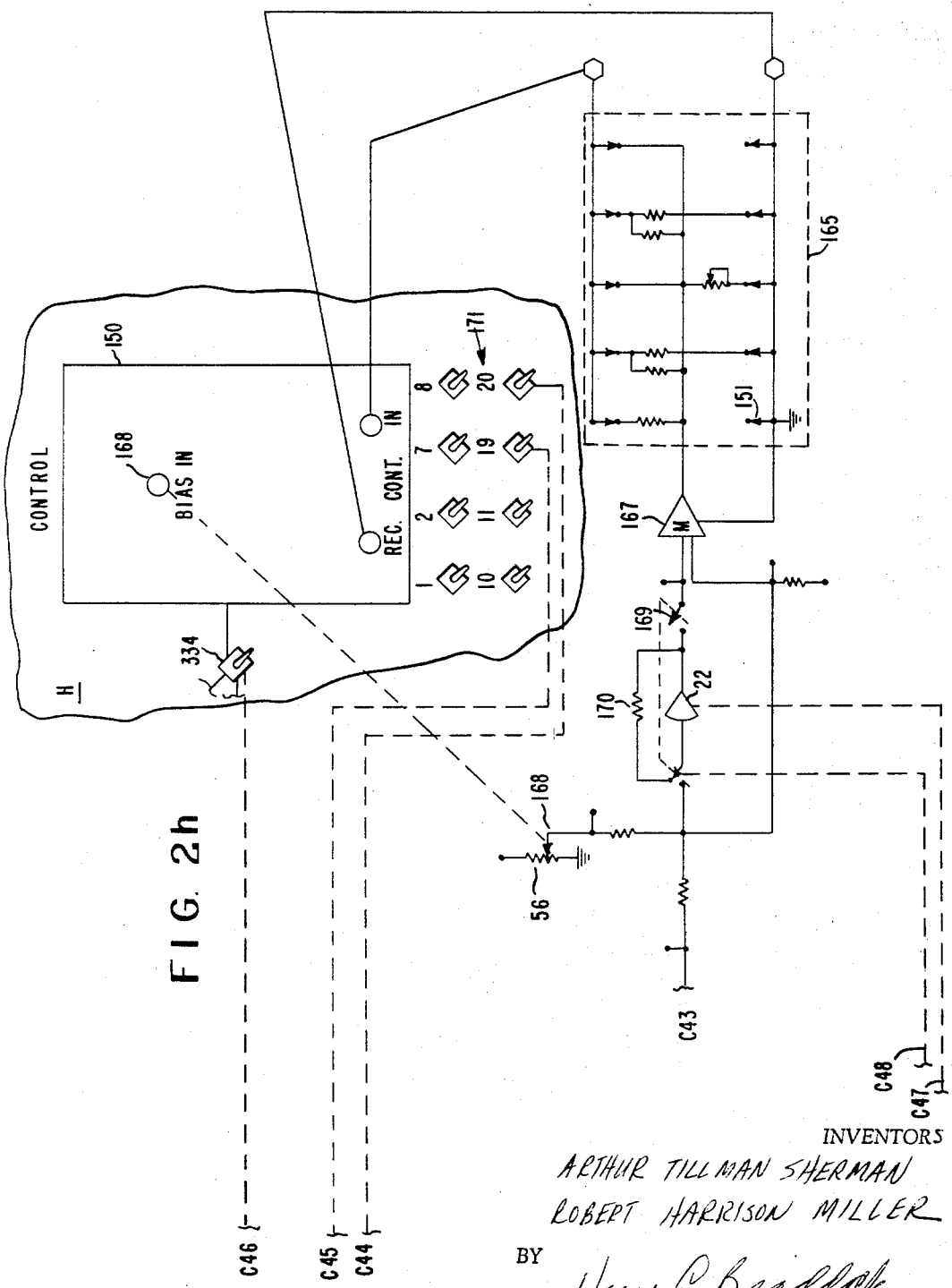
Figure 2J:
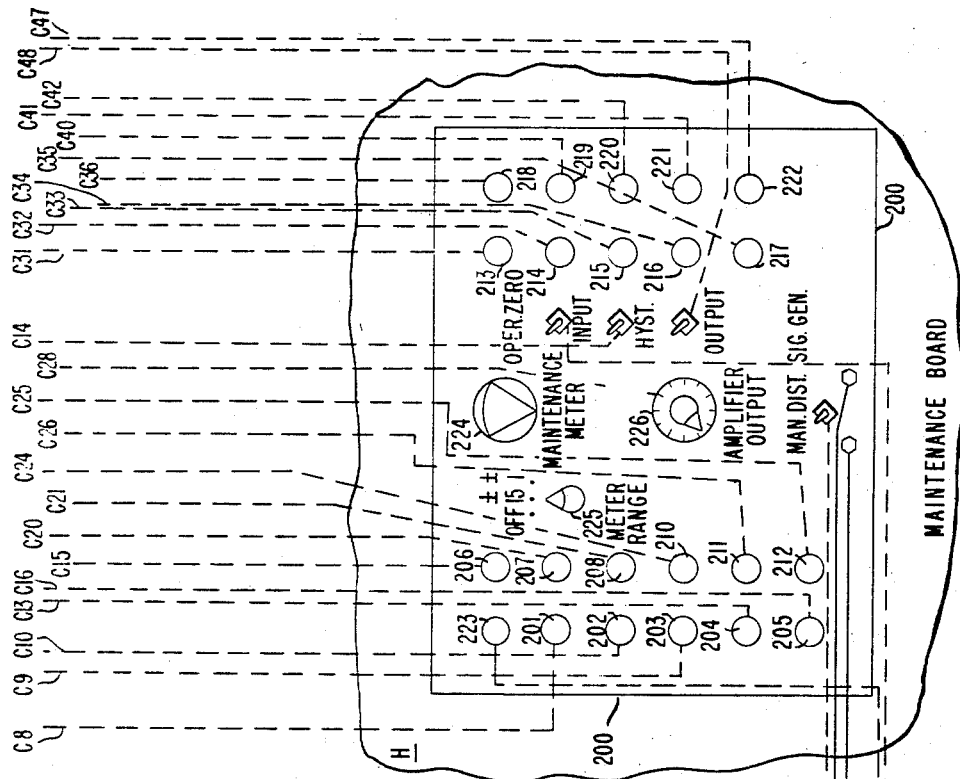
Figure 2I:
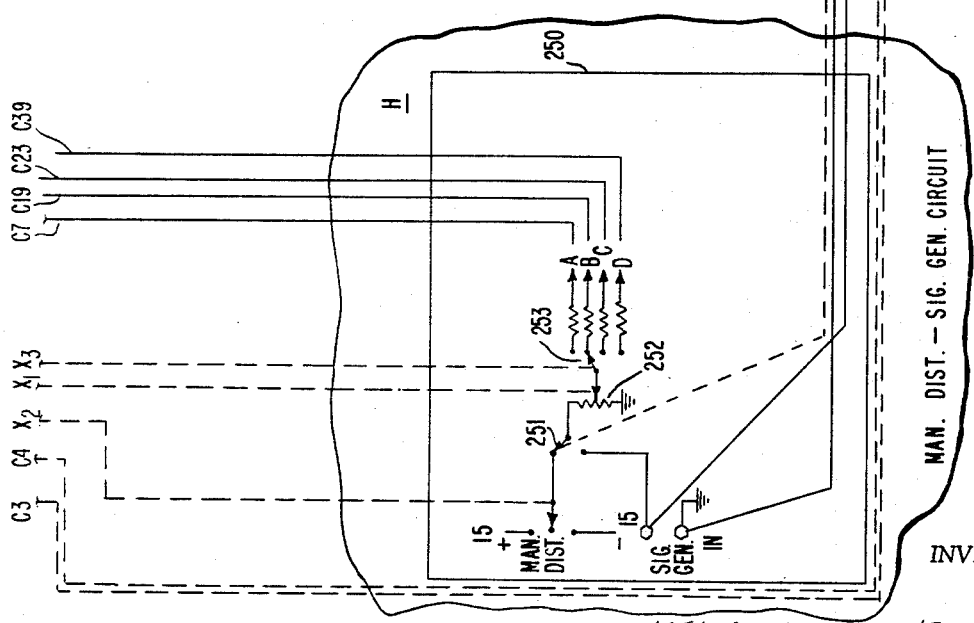
Figure 3:
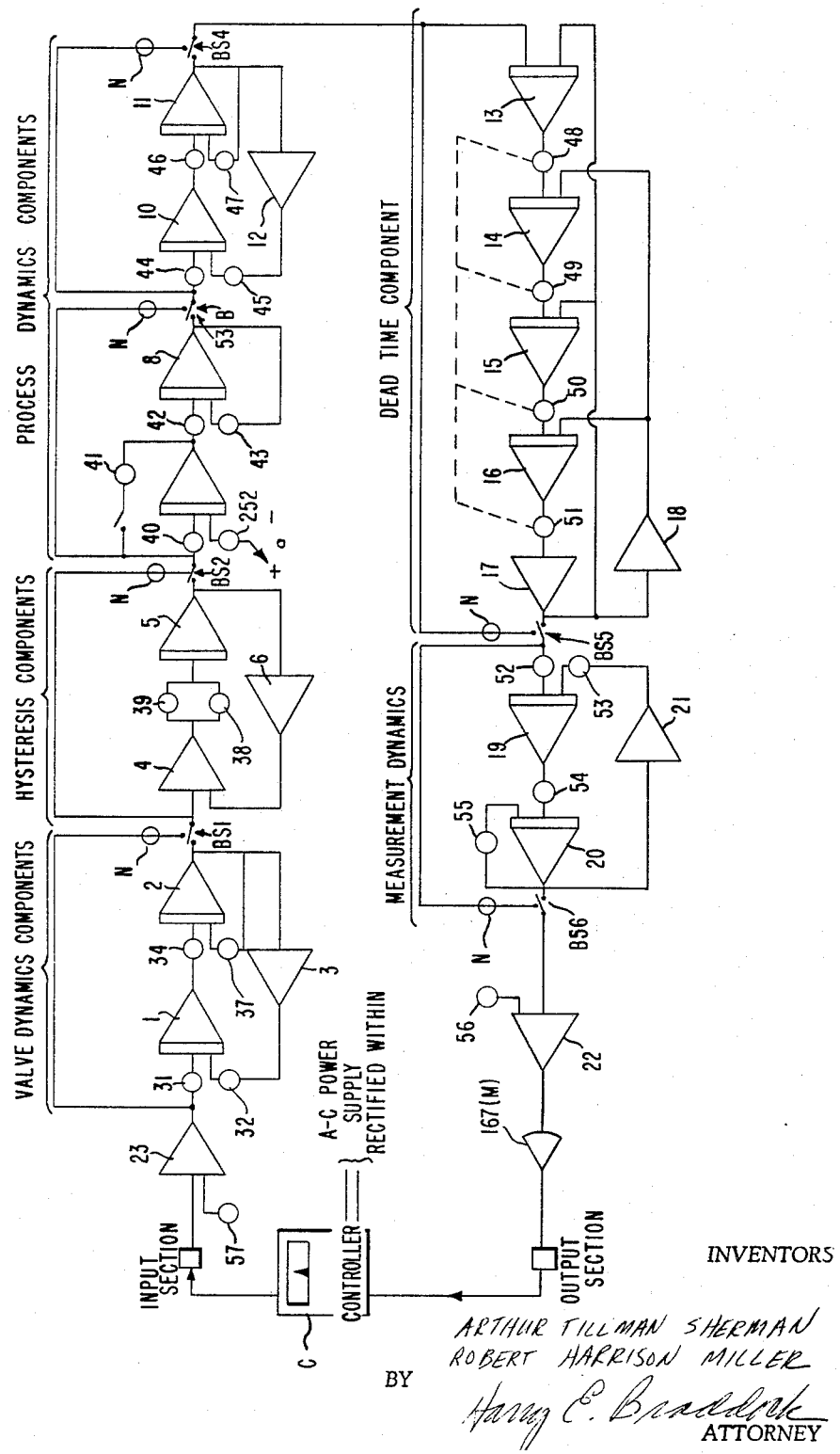

Additional objects and advantages will appear from a consideration of the following specification and claims, taken in conjunction with the accompanying drawings in which:

FIGURE 1 is a partial isometric view of an improved group training apparatus embodying principles of this invention shown in operative position for performing the group training and teaching function and operatively connected to a conventional automatic process control unit or system, the apparatus adapted to the simulation of an open and/or closed control loop in a chemical or other process including the final control element (valve) as an essential component, FIGURES 2a, 2b, 2c, 2d, 2e, 2f, 2g, 2h, 2i, and 2j together form a composite schematic diagrammatic view of the operative electrical and physical features of the apparatus shown in FIGURE 1, showing the operation and relationship between the electrical components and the other features in a preferred embodiment; FIGURE 2a showing a circuit diagram of the automatic control unit signal receiving selector and adaptor component or subassembly, FIGURE 2b showing a circuit diagram of the valve dynamics simulation, or computing component, FIGURE 2c showing a circuit diagram of the hysteresis simulation, or computing component, FIGURE 2d showing a circuit diagram of one process dynamics simulating, or computing component, FIGURE 2e showing a circuit diagram of another process dynamics computing component of the apparatus, FIGURE 2f showing a circuit diagram of the dead time computing component, FIGURE 2g showing a circuit diagram of the measurement dynamics computing, or simulating, component, FIGURE 2h showing a circuit diagram of the automatic control unit signal transmitting selector and adaptor component, FIGURE 2i showing a circuit diagram of the component of the apparatus for selectively applying a disturbance signal to the other various components simulating various aspects of the process, and FIGURE 2j showing a circuit diagram of the component for servicing, maintaining, and testing the various other components, FIGURE 3 is a more general schematic diagrammatic showing of the apparatus of the preceding figures, FIGURE 4 is a circuit diagram of the precision power supply component of the apparatus of the preceding figures, FIGURES 5a and 5b are respectively a detailed schematic circuit diagram of the operational amplifier unit used in the components of the apparatus of this invention, and the schematic symbol which represents the amplifier unit in the circuit diagrams of the components of this apparatus.

Automatic controlled industrial processes demand a great deal of knowledge and skill to keep them operating. For example, an instrument mechanic must combine experience in instrument installation, operation, and repair with an understanding of the relationship of the instruments to the process. The apparatus of this invention is designed to meet these needs by providing a communications medium for handling two very difficult tasks in group training: (1) the transferral of theoretical information into realistic terms, and (2) allowing the trainee an opportunity to observe in practice on real automatic process control equipment operating under conditions representing actual values.

The apparatus of the invention, as described in detail hereinafter, will simulate most industrial plant control loops currently in use. With this apparatus an instructor can demonstrate an automatically controlled process which behaves almost exactly as the actual plant process.

Essentially, the apparatus of the invention involves a specially designed analog simulator mounted in a housing, the exterior of which is provided with visual representation of the process being simulated and its significant variables is, as shown in the drawings, completely transistorized, rugged, and portable, and is designed according to a mathematical model of a process control loop. As generally shown in FIGURE 1 the simulating, or computing, and other components are mounted in a housing assembly H which is provided with an exterior portion on which are mounted visual representations of the process being simulated and of the significant variables of the control loop. In addition, indicating, adjusting and actuating means for the components are mounted on the housing assembly exterior as will be described hereinafter. Also, the housing assembly is provided with base support elements B and handgrips M for manually transporting the apparatus and also power supply conduit P. The apparatus is permanently programmed to perform one operation—simulation of the control loop of automatically controlled industrial process. The apparatus of the invention provides the necessary educational aid to demonstrate effectively to sizable groups of trainees, with empirical and published data, the following five principal automatic process control areas in any combination: final control element (valve dynamics), hysteresis, process dynamics, dead time, and measurement.

It is designed to be compatible with the electronic recorder-controllers, or automatic process control units, sold commercially by Foxboro, Taylor, Minneapolis-Honeywell, and Leeds & Northrup, and others. Pneumatic recorder-controllers, or automatic process control units, can also be used with the disclosed apparatus of this invention by using electronic-pneumatic transducers. Almost all process conditions affecting the control loop can be computed and indicated (simulated) with the apparatus of the invention and a recorder-controller operating as a unit in a closed loop, as shown in the drawings.

One or more of the computing components corresponding to the above-mentioned major areas can be switched in or out of the loop and, in addition, their time responses can be varied selectively to reproduce a slow or fast response. Proportional band, reset, rate, and any combination of the three, including three-mode control, can be demonstrated. Switching from automatic control to manual or from manual to automatic can be practiced so the operators can learn to transfer control of a process without disturbing the process. Mechanics, for example, can learn to tune the control loop so the instruments respond properly to disturbances or load changes. Optimum control settings can be found for loops which are in operation but not tuned properly. The electrical components are operatively mounted in a housing H which is provided graphic display panel having visual representations of the process being simulated and of each significant variable. This makes the transition from the simulated loop to the actual process control loop relatively simple and effectively aids sizable groups of trainees in getting the true picture of the process control loop.

The disclosed apparatus embodying principles of the invention is designed to provide a guided program of experimentation with the five most significant functions of control loops in order to improve the trainees' understanding and ability to maintain and service process control equipment and instruments and teach methods of establishing optimum controller settings. Furthermore, disturbance signals with forms such as sinusoidal, ramp, or step functions can be introduced selectively into any section of the simulated control loop as will be described in detail hereinafter. This affords the ability to perform frequency response analyses on the simulated loop or any section of the loop, and greatly adds to the flexibility of the device as a group training tool.

Referring to the dynamics of the final control element (valve), the dynamics of almost any physical process can be described by a series of linear and nonlinear simultaneous differential equations of low order (usually first or second order). The dynamics of the valve or final control element, for example, are generalized in the following equation:

$$\frac{\text{Output}}{\text{Input}} = \frac{K_v}{T_v^2 S^2 + 2 T_v S d + 1}$$

where
$K_v$ = Gain
$T_v$ = Time constant
$d$ = Damping factor
$S$ = Laplacian operator This equation is a mathematical model of the valve dynamics. Programming this equation in analog computer terms results in the following analog program:

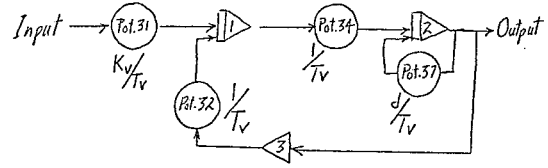

The gain, damping factor, and time constant of the system in the mathematical model appear in form suitable for resistance values or potentiometer settings in the modeled form or analog program. By varying potentiometer settings the gain, ($K_v$), time constant ($T_v$) and damping factor ($d$) may be changed to thereby vary the dynamics of the valve. This is used advantageously to simulate the action of various valves: large, small, slow, or fast, or other types of final control elements.

In FIGURE 3 the general apparatus arrangement of the invention is shown in computer format. The input of a conventional, commercially available indicating and/or recording automatic process control unit C is available from the simulating or computing components through the output section. Amplifier number 22 in conjunction with the potentiometer numbered 56 and magnetic amplifier numbered 167, converts the normal simulated or computed voltage characteristics to a range of signals acceptable to various indicators, recorders and automatic process control units.

The Measurement Dynamic Section, or component, consists of two integrators numbered 19 and 20 connected electrically to simulate typical measurement devices with a wide range of time constant settings. These time constant values are obtained through a range of settings from 0.000 to 1.000 in the potentiometers numbered 52, 53, 54 and 55. Amplifier 21 provides the feedback signal with correct polarity.

This configuration permits simulation of a typical instrument measurement installation. The characteristics of such an installation are duplicated in this computing component, or simulating section by first or second order lags with true time constants or some multiple of the true time constants and are adjustable from about 0 to over 400 seconds through appropriate adjustment of the potentiometers numbered 52, 53, 54 and/or 55.

The conventional, commercially available or special electronic indicating and/or recording automatic process control unit C which is connected between the Valve Dynamics and Measurement Dynamics Section acts and performs in a similar manner to one installed in an operating plant.

The output of such a commercially available or special automatic process control unit is connected to the input of the interconnected computing or simulating components to form a closed or control loop. Amplifier numbered 23 in the input section and potentiometer numbered 57 convert the incoming controller signal to a simulator voltage proportional to the controller signal.

As shown in FIGURE 1 the electrical components are mounted in a housing H on the exterior surface of which are provided a visual representation of the process being simulated and of each significant area and variable thereof.

In the embodiment of this application the Final Control Element Area is shown as a Valve Dynamics Section followed by a Hysteresis Section. While the Final Control Element is shown as separate Valve and Hysteresis Sections, Final Control Elements of all types can be simulated.

The Valve Dynamics Section consists of two integrators numbered 1 and 2 connected electrically to simulate a typical valve (final control element) installation with a wide range of time constant settings. These time constant values are obtained through a wide range of settings from 0.000 to 1.000 on the potentiometers numbered 31, 32, 34 and 37. Amplifier number 3 provides the feedback signal to integrator number 1 with the correct polarity.

This arrangement permits simulation of a typical Final Control Element installation. The characteristics of valve installations (final control elements) are duplicated in the computing components by first or second order lags with true time constants or some multiple of the true time constants which are adjustable from about 0 to over 400 seconds. These values are obtained through appropriate adjustment of the potentiometers numbered 31, 32, 34 and/or 37.

The second section or comopnent used in computing or simulating the final control elements is the Hysteresis Section. The Hysteresis Section consists of one amplifier number 4 and one integrator number 5 connected electrically to simulate typical hysteresis of valve installations (final control elements) with a wide range of adjustment of hysteresis values. These values range from about 0 to 55% tnd correspond to potentiometer setting of 0.000 to 1.000 on potentiometers numbered 38 and 39. Amplifier 6 provides the feedback signal with the correct polarity for amplifier 4.

The Process Dynamics Area is divided into two sections, or computing components either or both of which can be used to simulate certain actions of a process.

The first section of the Process Dynamics Area consists of two integrators numbered 7 and 8 connected electrically to simultte typical integrating or lag type process with a wide range of time constant settings. These time constant values are obtained through a range of settings from 0.000 to 1.000 on the potentiometers numbered 40, 41, 42 and 43. Position of toggle switch adjacent to potentiometer 41 determines whether process is integrating or lag type.

This arrangement permits simulation of a typical integrating or lag process. The characteristics of either type of process is duplicated in the simulator by first or second order lags with true time constants or some multiple of the true time constants which are adjustable from about 0 to 400 seconds.

Potentiometer 252 operating with the three position toggle switch permits a simulated load to be introduced by positioning the three position switch to either $+$, 0, or $-$. The magnitude of the load change is adjustable on the potentiometer through a range of settings from 0.000 to 1.000.

The second Process Section of the Process Area consists of two integrators numbered 10 and 11 connected electrically to simulate typical processes having a wide range of time constants. These time constant values are obtained through a range of settings from 0.000 to 1.000 on the potentiometers numbered 44, 45, 46 and 47. Amplifier 12 provides a feedback signal with correct polarity.

This arrangement permits simulation of a typical process configuration. The characteristics of the process are duplicated in the simulator by first or second order lags with true time constants or some multiple of the true time constants which are adjustable from about 0 to over 400 seconds.

The Dead Time Section consists of four integrators numbered 13, 14, 15 and 16; and amplifier 17 connected electrically to simulate typical dead time encountered in a typical control loop. It has a wide range of time settings. These time settings are from 0.000 to 1.000 on the potentiometers (four ganged) numbered 48, 49, 50 and 51. Amplifier 18 provides a feedback signal with the correct polarity.

The characteristics of this dead time are duplicated on the simulator by true dead time values adjustable from about 1 to 50 seconds.

Switches BS1, BS2, BS3, BS4, BS5 and BS6 are provided at each area or section which allows bypassing of that section or area so that the effect of each section or area can be demonstrated separately and conclusively. Signal lights N are included on each section which light when a section or area is bypassed.

For a more detailed description, reference is made to the valve dynamics section, or computing component 100 in FIGURE 2b of the composite schematic diagram of the apparatus. This section will be described in detail as illustrative of the arrangement and functioning of the other computing sections. On the exterior of housing H appears the visual representation 101 of the valve centered in the square block 102 which corresponds to the valve dynamics section or computing component of the apparatus. The meter 103 indicates the action of the valve and can either be considered as throughput through the valve or valve position, with zero or midscale being the normal operating or quiescent point. The dashed line 104 around the block 102 corresponds to a bypass circuit and shows that this section can be readily bypassed by virtue of the bypass switch BS1. Neon signal light N is energized, or lighted when the valve dynamics section 102 is bypassed (104) and the signal from the control component 107 circumvents the valve dynamics component, or section 102 and is transmitted forward into the hysteresis 108, process dynamics 109, and/or other components. Actuating means 110, 111, 112, 113, 114 and 115 for six potentiometers are positioned in a row along the bottom of the visual representation 102 of the valve dynamics component. Actuating means 110 for potentiometer 31 represents the gain term $K_V/T_V$ in the mathematical equation. Adjustment of this potentiometer will adjust the gain of the valve dynamic computing component or section. Adjusting or actuating means 111 is for potentiometer 32 which is a time constant potentiometer in the feedback loop of the analog program. Potentiometer 34 with adjusting means 112 is also a time constant potentiometer in the forward loop of the program, and potentiometer 37 with adjusting means 115 represents the damping factor in the valve dynamics equation. Potentiometers 35 and 36 with adjusting means 113 and 114 are electronic limiters, and through their adjustment capacity limiting characteristics of the valve may be simulated. Considering further the circuit diagram of the valve dynamics section as shown in FIGURE 2b, relay 116 in the input to amplifier 1 is a "Hold" relay. When this switch is opened, the circuit, which is an integrator circuit, will stop and "Hold" its last computed output (121) voltage value. When the switch is closed, integration will continue as a function of the input signal from potentiometer 31. Relay 117 is a "Reset" relay. This relay during operation is open. However, should it be desired to return to an initial or starting condition during operation, the Reset button 120 is pushed and the relay is closed; thereby shorting the output at 121 back to the summing junction or input 122 of the amplifier 1, which drives the output at 121 to zero. These two relays, the Hold 116 and Reset 117 operate together. In the "Reset" condition the Hold switch 116 is open and the Reset switch 117 is closed. When "Hold" button 125 is depressed the Reset switch 117 and Hold switch 116 are both open and the last known output signal will be maintained by the integrator's capacitor 123. In the Operate condition, with button 124 depressed, the Hold switch 116 is closed and the Reset switch 117 is open, and the circuit integrates the input signal. The amplifier symbol 1 comprises the same circuitry as the other amplifiers 2–23 and is described in detail in the following paragraphs in connection with FIGURES 5a and 5b.

FIGURE 5a is the basic schematic circuit diagram of the operational amplifier used in the apparatus of this invention. FIGURE 5b shows the symbol 2 which represents this circuit. This symbol is used throughout the other schematic circuit diagrams and in each case represents the same operational amplifier circuit.

The amplifier may be considered as comprising three main sections, (1) the input oscillating stage 603, (2) the detecting and amplifying stage 604, and (3) the output stage 605.

The input signal ($e_{in}$) is fed through an external input resistor 606 to the summing junction 607 of the operational amplifier. The signal is then fed to one side of a variable capacitance bridge. Two voltage-sensitive capacitors 608 are arranged in their own bridge-type network in the base circuit of the input stage (transistor 609). The variable capacitance bridge is excited by one megacycle oscillation developed by the amplifier 609 circuit, which has a positive feedback loop causing oscillation. The feedback is accomplished by the mutual inductance between the windings of the transformer 610 connected in the collector circuit and the secondary connected in the capacitance bridge-base circuit.

The capacitors 608 in the bridge are alloy junction silicon diodes, the capacity of which may be varied by the application of a voltage. The diodes enable the circuit to operate as a modulated amplifier. An explanation of the operation of the device following the application of an external voltage ($E_{in}$) will make this clear. Assume that the voltage applied to the diodes is zero and the bridge potentiometer or zero balance pot 401 has been adjusted to produce a low level oscillation. At this point the oscillation is of constant amplitude and the loop gain is one (1). If a small DC voltage of proper polarity is applied to the diodes 608, the capacity of one (1) will be increased and the other decreased. The added unbalance of the bridge increases the tranmission through the feedback loop transformer 610. The loop gain is greater than one (1) and the amplitude of oscillation will expand. The amplitude will increase until the falling load impedance reduces the loop gain again to unity. This is done, of course, through the external feedback resistor 612 connected to the summing junction 607.

This arrangement produces a high input impedance to the output of the feed back circuit necessary for the long-time constants, because the voltage-sensitive capacitors 608 are operated on the portion of their characteristic curves where no current will flow.

The zero balance potentiometer 401 adjusts the base-bias current with no input signal applied to result in a zero output ($E_{out}$). This adjustment causes the input stage transistor 609 to just oscillate.

The capacitor 613 between transistor 609 and the second stage transistor 614 merely blocks the DC component. This stage 614 detects and amplifies the amplitude change from the collector of transistor 609 which is a function of the input voltage ($E_{in}$). The output of transistor 614 is filtered by the capacitor 615 in series with resistor 616, which removes the high oscillator frequency signal. The signal of transistor 614 drives the output transistor stages 617 and 618.

The output stage 605 of the operational amplifier, comprising transistors 617 and 618, are connected in a common-collector arrangement. Transistor 617 is a PNP type transistor and transistor 618 an NPN type, with similar characteristics. A circuit employs the advantages of the complementary symmetry of the two types to provide push-pull operation with single-ended input. The transistor 618 conducts during the positive swing of the driving signal, and the transistor 617 conducts when the drive goes negative. Any input to the amplifier causes one of the output transistors to conduct more heavily than the other, and current flows through the external load. The output voltage appears between the output terminal 619 ($E_{out}$) and ground.

With such operational amplifiers, because of their high gain characteristic, the determining factors on their operation are the input and feedback impedances. In the case of amplifier 1, as shown in FIGURE 2b, there are two input resistors 126 and 126′ which feed into the summing junction 122 of the amplifier. The feedback impedance in this case is capacitor 123. This circuit configuration is referred to as an integrator circuit. With a voltage impressed on the input 118, the circuit will integrate it with respect to time. The switch 127 in the feedback circuit is a time scale switch. In the N, for normal, position the time scale system is speeded up by a factor of 10. (Simulated time=.10×actual time.) That is, if the valve actually closes in one second, as far as the valve dynamics computing section is concerned, it will close in its simulation in a tenth of a second. The S position of switch 127 which, for training purposes, is considered the Slow position, is real time. (Simulated time=actual time.) This occurs because of the voltage divider network 128 on the output point 121 of amplifier 1. The limiter networks around amplifier 1 comprises potentiometers 35 and 36 and their companion diodes. By adjusting these potentiometers the bias on the diodes can be varied so that output voltage ($E_{out}$) at 121 either positive or negative can be limited at a predetermined level. In amplifier 2 are Hold and Reset switches 132 and 133 also, as well as the time scale switch 134. The input resistors, 135 and 135′, and the feedback capacitor 136; which completes the integrator circuit. The final portion of the valve dynamics circuit is formed by amplifier 3. This amplifier has an input resistor 138 and a feedback resistor 139. In this arrangement the operational amplifier performs the mathematical operation of summing. The operative relationships and connections between the features of the circuit and the features on the exterior of the housing H are shown by the appropriate lines in the figures.

Other aspects of this valve dynamics section circuiting relate to maintenance. Lines C8, C9 and C10 from amplifiers 1, 3 and 2 represent operative connections from the zero balance potentiometers 401 of each amplifier to the mechanical actuating means for each in the maintenance section 200 shown in FIGURE 2j. The zero balance potentiometer 401 of a representative amplifier is shown in FIGURE 5a. The actuating means for adjusting this potentiometer is mounted in the maintenance panel or section 200 (FIGURE 2j) and is so indicated by reference numeral 201, and the actuating means for the zero balance potentiometer of amplifier 2 is likewise designated as 202 and so on all the way up to actuating means 223 for the zero balance potentiometer for amplifier 23. Each of the amplifiers 1–23 has such a zero potentiometer arrangement the actuating means for which is mounted on the maintenance panel in the exterior of the housing H of the training apparatus.

In FIGURE 2b the terminal 140 connected to the input of amplifier 1 is connected selectively to the disturbance signal generator component or circuit 250 shown in FIGURE 2i. By use of the manual disturbance or signal generating switch 251 this component applies or inserts into the input of the valve dynamics computing circuit, or system either a step change shown as a manual disturbance, or a ramp square wave, or sine wave from a signal generator unit. This signal may be attenuated by potentiometer 252 and directed by virtue of selector switch 253 selectively into the input of valve dynamics component 140, process dynamics component 141, process dynamics component 142, or the measurement component or section 143. With this capability, or feature, frequency response analysis may readily be performed on any of these four sections, or any combination of the sections in the apparatus.

The mode switch 144 in the left-hand portion of FIGURE 2a is a three-position switch with positions: reset-hold-operate. The operation of this mode switch affects amplifiers 1, 2, 7, 8, 10, 11, 19, and 20 because these amplifiers are the main integrating amplifiers.

On the maintenance panel or unit 200 (FIGURE 2j) are located a maintenance meter 224, a meter range switch 225, an amplifier output selector switch 226, and operational switches for the input, hysteresis, and output components, or sections, of the simulator.

The control componets or sections of the training apparatus has to do with peripheral equipment or switches which are needed to facilitate instructor-trainee group communication, as well as operation of the apparatus. The control section is graphically represented on the exterior of the housing H of the group trainer apparatus. The control section as shown in FIGURES 2a and 2h consists of two parts; one part 150 (FIG. 2h) which feeds the computed or simulated signal into the recorder-controller unit, and the other part 151 (FIG. 2a) which accepts the output or control signal from the recorder-controller unit for the process simulating components. Considering first, the recorder-controller output section 151 which appears in FIGURE 2a, the meter 152 indicates the output of amplifier 23 at point 153 between the recorder-controller unit and the computing components of the apparatus. The recorder-controller unit output is connected to the computing components of the simulator via the two banana plugs 154. This signal is fed selectively through an input network 155 designed specifically for the particular unit connected and then fed into input of the amplifier 23. There are shown selectively connected input networks designed for Foxboro, Minneapolis-Honeywell, Taylor, and Leeds & Northrup instruments and these are selected by the selector switch 157 which can be readily seen in the visual representation 151 on the housing exterior of FIGURES 1 and 2a. However, an external position or connection 158 exists by which any other manufacturer's instrument through proper impedance matching networks can be made compatible with the computing sections of the simulator.

Most off-the-shelf manufacturers' process control units or instruments have "live" zero output; that is 4–20 ma., 1–4 v., 10–50 ma. signals for 0–100% full scale. The computing components internal signals are generated from + to −10 v. Therefore, amplifier 23 serves to modify the controller unit signal and adapt it to the computing components ±10 v. signal system. The bias out potentiometer 160, as indicated in FIGURE 2a is the referencing device which allows the recorder-controller unit and the simulator computing sections to be adapted to each other. For example, the Minneapolis-Honeywell recorder-controller has an output signal of 4–20 ma. This reference to a ±10 v. system means that 4 ma. from the recorder equals −10 v., 12 ma. equals 0 v., and 20 ma. equals +10 v. By virtue of the M/H position input network, the amplifier 23 and the bias out potentiometer 160, the transition between the two systems can be readily made.

In the circuitry associated with amplifier 23 there is an operative connection C3 shown from switch 161 to actuating means marked "input," on the maintenance panel 200. The actuating means opens the switch contacts when thrown from operate to zero and the input signals are thus removed from the input of amplifier 23. It can readily be seen that with both inputs lifted or removed, one from the recorder-controller unit output, and the other from the bias potentiometer 160, the input signal to amplifier 23 is zero, and since it is a summer the ouput is zero. By using the amplifier output select switch 226 on the maintenance board 200 and the ±1 v. position on the meter range switch 225, the amplifier zero adjustment can be made by using potentiometer actuating means 223 on the maintenance board 200, which is the zero balance potentiometer in amplifier 23.

In the second half of the control section 150 (shown in FIGURE 2h), which is the recorder-controller unit input, or the simulator apparatus output, we have similar selective impedance matching networks 165 which are selected by the same selector switch 157 as in the portion of the control 151 component earlier described. In other words, when M/H is selected as the desired recorder-controller output section, the input to the simulator is not only adapted for the Minneapolis-Honeywell recorder-controller unit, but the output circuit is so adapted as well. Following the earlier discussion of an M/H controller unit the ±10 v. signal from the computing components must be converted so that it is compatible with the input signal required by the recorder-controller unit. This is done in the output stage which consists of amplifier 22 and a magnetic amplifier 167. The bias in potentiometer 168 adjusts the midpoint of the computed or simulated output signal, compatible with the recorder-controller unit—that is, −10 v. into amplifier 22 will give 4 ma. out, +10 v. will give 20 ma. out. The magnetic amplifier 167 is used to provide the necessary power for the many different types of commercial recorder-controller units. The switch 169 performs essentially the same function as switch 161 in the first half of the control section 151. When the switch 169 for amplifier 22 is thrown to the zero position, from operate, on the maintenance board 200, the output and input circuitry are disconnected and replaced with a feedback resistor 170 which allows zeroing, in which the actuating means 222 for the amplifier 22 zero balance potentiometer may be adjusted using the ±1 meter range postion on meter 225.

The time scale switches 171 (FIGURE 2h) located directly below the control section, or recorder-controller input section 150, perform the functions as previously explained in the amplifier noted.

Referring to the valve hysteresis aspects of the apparatus, the ASME terminology for automatic controls states that hysteresis is that property of an element evidenced by the dependence of the value of the output, for a given excursion of the input, upon the history of prior excursions, and the direction of the current traverse. And, also, the hysteretic error is the maximum separation due to hysteresis between up-scale going and down-scale going indications of the measured variable (during a full-range traverse, unless otherwise specified) after transients have decayed. This phenomena commonly appears as a closed loop in the plot, or graph, relating the two variables during a cyclic process. The form of this loop may be affected by the rate of cycling, by the number of previous cycles, and by the time elapsed since the previous cycle. The diagram shown in the hysteresis section 108 visual representation (FIGURES 1 and 2c) is a typical hysteresis curve.

In the hysteresis computing section of the group training apparatus of the invention the meter 171 performs the same operation as previously described in the valve dynamics computing section; it indicates the output of the hysteresis contribution to the valve dynamics simulation or computations. The bypass switch 172 indicated both in the visual representation and schematic showings provides a bypass around the hysteresis section 108 completely, if desired. With the section bypassed, of course, the valve dynamics section 102 then simulates the action of a valve with either 0% hysteresis or with a valve positioner device attached. The circuitry is formed by the electrical connections of amplifiers 4, 5, and 6. The hysteresis circuit is a normal analog approach to the simulation of the hysteresis effect. It uses two potentiometers 38 and 39, to vary the degree or magnitude of the hysteretic error. As previously described, in the valve dynamics section each amplifier has its zero balance potentiometer actuating means mounted on the maintenance panel 200, whereby each amplifier prior to operation may be balanced. In addition, the circuit contains a hysteresis switch 178 which allows this zero balancing to be performed. This switch lifts or removes the input to the individual amplifiers and isolates them so that a zero condition on the input exists which is necessary to balance the amplifiers.

With respect to the process dynamics aspects of the apparatus the next two sections 109 and 300 (FIGS. 2d and 2e) are labeled process dynamics and provide the necessary flexibility to simulate most processes.

In the first process dynamics section 109 there is meter 301 which indicates the output voltage. There is an integrate-lag switch 302 which provides the ability to use the first stage of this section as either a first order lag, which would simulate the response across a filled tank, or, in the integrate position, which would simulate filling or emptying the tank and would consider the response of the entire system. The potentiometer actuating means 303, 304, 305 and 306 for potentiometers 40, 41, 42 and 43 perform essentially the same functions as those previously described in the valve dynamics section; that is, to provide gain and time constant variability. Potentiometer 252 was previously described as the attenuator or potentiometer which controls the amplitude of the disturbance signal. The disturbance signal switch 251 and the section switch 253 are positioned below this process dynamic section for ease of operability. Also, this section contains a bypass switch 307 which allows the section to be completely removed from the loop, if desired.

The second part 300 of the process dynamics section (FIG. 2e) has the ability to perform as either a first or second order lag system. Actuating means 308, 309, 310 and 311 for potentiometers 44, 45, 46 and 47 performed the usual gain and lag functions. The amplifiers 10, 11 and 12 and associated connections make up the circuit and likewise have actuating means for their zero balance potentiometers mounted on the maintenance panel 200. The ability to inject into the input of this system at point 142 either a disturbance signal (sine ramp or square wave signal) is also present in this section as shown. Also, the meter 315 indicates the output of this section. A bypass switch 316 with a companion signal light 317 is provided as well.

The mathematical equations which represent the process dynamics sections are shown below.

PROCESS 1

$$\frac{\text{Output}}{\text{Input}} = \frac{K_{p1}}{T_1 S + 1}$$

$$\frac{O}{I} = \frac{K_{p2}}{T_2 S + 1}$$

PROCESS 2

$$\frac{O}{I} = \frac{K_{p3}}{T_3^2 S^2 + 2T_3 dS + 1}$$

Pot. 40 = $K_{p1}/T_1$
Pot. 41 = $1/T_1$
Pot. 42 = $K_{p2}/T_2$
Pot. 43 = $1/T_2$
Pot. 44 = $K_{p3}/T_3$
Pot. 45 = $1/T_3$
Pot. 46 = $1/T_3$
Pot. 47 = $d/T_3$

These equations are programmed in the analog form as shown in the schematic (FIG. 3).

Dead Time is any definite delay between two related actions, or it is the interval of time between initiation of an input change or stimulus and the start of the resulting response. In process loops it is considered to be the time it takes for a change in the process to be detected by a measurement device. In a physical system, this could be caused by the measurement device being located a long distance from where the action or process reaction takes place. The known Padé approach used in the apparatus of this invention is considered to be an acceptable scheme of producing a true time lag. This scheme is based upon the mathematical approximation to the Laplacian shift operator $E^{-sT}$, and allows a good representation of the true time lag for a value of T even as great as a minute or longer, if necessary. The apparatus disclosed herein uses an eight-root Padé approximation to true dead time. The circuit schematic is essentially the analog program representing the mathematical model of this Padé approximation, which is:

$$e^{-Ts} \approx \frac{T s^{44} - 20 T s^{33} + 180 T s^{22} - 840 T s + 1680}{T s^{44} + 20 T s^{33} + 180 T s^{22} + 810 T s + 1680}$$

Pots. 48–51 = $1/T$ seconds

In FIG. 2f the visual representation 318 of the dead time display, the meter 319 indicates the output of the dead time simulation. Potentiometers 48–51 are ganged, physically connected together and driven by the one actuating means 320. In this circuit, as in the previous ones, the integrators (amplifiers 13, 14, 15 and 16) have the usual "Hold" and "Reset" switches. All of the amplifiers have the actuating means for their zero balance potentiometers mounted on a maintenance panel 200. Also, switch 325 and neon signal light 326 perform the usual bypass function for this section.

With respect to the measurement dynamics (FIG. 2g) of the apparatus, the visual representation 330 on housing H corresponding to the measurement section contains indicating meter 331 on a temperature bulb outline 332, and actuating means 333 for four potentiometers 52, 53, 54, 55 which are used to vary the gain, damping, and time constant of the measurement simulation in the manner previously described. This circuit is identical in construction to the valve dynamics section 102 and therefore the previous explanation and description applies directly. The section also contains a bypass switch 334 and neon signal light 335.

The equation for this simulation is as shown below:

$$\frac{O}{I} = \frac{K_m}{T_m^2 s^2 + 2 d T_m s + 1}$$

Pot. 52 = $K_m/T_m$
Pot. 53 = $1/T_m$
Pot. 54 = $1/T_m$
Pot. 55 = $d/T_m$

The circuit schematic diagram portion 336 is essentially the analog program of this mathematical equation.

In a practical sense, this section simulates the action of a thermobulb or thermocouple, flow sensing element such as differential pressure, pressure sensing device, etc. Its output signal simulates the process variable, and appears on the recorder-controller unit and is compared with the reference or set point signal. This is accomplished through the control section amplifier 22 and impedance matching network 165, as previously described.

The following is a brief circuit description of the +15 volt DC Plug-In Precision Power Supply as shown in FIGURE 4. This following description refers to the positive (+15) volt supply. However, it applies directly to the −15 volt supply indicated at 49, since the two supplies are identical, except for the ground connection which replaces the plus connection in the positive supply making the 15 volt output below ground or −15 volts.

The rectifier circuit consists of a pair of silicon diodes 50 connected in a conventional full-wave configuration. Filtering is provided by a large electrolytic capacitor 51. The power supply is electronically regulated and uses a power transistor 52 as a series control element.

This power supply is a normal feed back regulator type and consists of a control element 52, a reference device 53, an amplifier 54, and a sampling and comparison circuit 55. The control element 52 and the amplifier 54 are transistors, while the reference device 53 is a solid state component (Zener) diode. The comparison circuit 55 generates an error signal which is the difference between the reference 53 and a sample of the output 56. The desirable properties of this circuit depend on having a high gain between the error signal and the control element.

The sampling circuit 55 of the regulator is a resistance divider circuit 57 across the load. The upper resistance 58 is bypassed with a capacitor 59 to increase the feedback for AC, thereby reducing the output ripple.

The comparison circuit 55 is a emitter-coupled differential amplifier (transistors 60, 61, 62, 63) with a reference device 53 applied to one base circuit, and the sample 57 of the output voltage applied to the other.

With this arrangement any change in output voltage results in a corresponding change in the transistor 63 base current. The change in base current of transistor 63 is amplified by transistor 62 and compared with the reference voltage of transistor 61 in the base circuit of the amplifying stage 64. This difference is amplified by transistor 64 and drives the transistor 65 accordingly. Transistor 65, in turn, determines the emitter-collector resistance of transistor 52. This transistor 52 controls the output voltage at 66 by simulating a variable resistor connected in series with the load and the power supply. Thus, any supply voltage variation appears across the series regulator 52 and not across the load, and any variation due to load change correspondingly changes the series resistance of the transistor 52 and restores the output voltage level at 66.

Summarizing various general aspects of the operation of the apparatus:

The function of the indicating meters is to enhance the communications ability between the instructor and the trainee group. First, the recorder-controller device which is normally used in the plant process to be simulated is attached and closes the loop formed by the simulator. A a dynamic situation develops, the contribution of each section of the loop, such as the valve, the valve's hysteresis, the process, the dead time, and the measurement action can be readily viewed by the group in training by virtue of these output meters. Utilizing the "Reset," "Hold," and operate mode switch this phenomena can be stopped merely by switching from operate to hold, whereby the various amplitude and phase relationships between each control section may be explained and studied as desired. If instability is encountered during the display or lesson, one merely has to reset by virtue of the mode switch and the operation of the complete simulator, as well as the external recorder-controller returns to the starting condition or balance point.

The bypass switches allow each section to be analyzed individually and then combined in any desirable manner. This, of course, permits independent analysis of the dynamics of each section. Understanding the individual contributions of the valve, the process, the dead time, and the measurement element is then practical.

The disturbance-signal circuitry allows a broad training use of the apparatus. By inserting step responses, pulses, ramps, sinusoid signals into any selected section, and, with the ability to vary the amplitude, frequency response analysis may be performed and described. This flexibility and capability of the trainer can be applied to the checkout and evaluation of potential plant process-type controlling instruments, either installed or proposed models, as well as to group training.

The maintenance panel arrangement permits a dynamic check and adjustment of amplifiers 1–23 in the system by merely selecting the amplifier output select switch, the proper meter range, and reading the output which is on the maintenance meter.

It is believed to be clear that an improved group training apparatus has been provided in accordance with the objects of the invention.

While a preferred embodiment of the invention has been described in detail, many changes and modifications within the spirit of the invention will occur to those skilled in the art, and all such are considered to fall within the scope of the following claims.

What is claimed is:

1. An improved group training and educational apparatus for simulating and displaying comprehensive substantially complete information about the theory and operation of an automatically controlled industrial process, said apparatus being compact, lightweight, and manually transportable and comprising one single housing assembly, a plurality of cooperating, operatively connected, selectively variable, selectively disconnectable, independent electrical computing components mounted in said housing, said computing components corresponding to, and constructed and arranged to simulate each significant variable of each significant component of a process being simulated, said apparatus further comprising a power supply component mounted in said housing and operatively connected to said other components for receiving electrical power from a given power source and supplying power to said other components, said apparatus further comprising a control component operatively connected with said computing components for selectively connecting and adapting the inputs and outputs of said computing components to the differing inputs and outputs of any one of a given number of different available conventional automatic process control units to form, with said computing components, a loop, said housing assembly comprising an exterior portion provided with enlarged accurate visual representations (1) of the process being simulated, (2) of each significant variable of the process, and (3) of an automatic process control unit connected to said apparatus; each representation having a corresponding visual indicating and visual display means operatively connected to one of said components to provide easily visible instantaneous simultaneous independent indications, suitable for direct group observation, of the action of each significant variable of the simulated process and of the action of a control unit with which said apparatus is connected, said apparatus further comprising electrical means cooperating with said computing components for selectively stopping, running, and rerunning any simulation and display of all its variables with selectively varied time bases, said apparatus further comprising electrical switching means for selectively rendering inoperative and disconnecting any computing component from said loop and simultaneously bypassing such disconnected inoperative component to maintain the loop, and manual actuating means for said switching means positioned adjacent each visual representation on the exterior portion of said housing assembly corresponding to each computing component, said exterior portion of the housing assembly provided with a visual indicator means, in addition to said switching means, positioned adjacent each visual representation to indicate when a given computing component is disconnected from said loop and bypassed, said housing assembly provided with supporting base means constructed and arranged for selective manual positioning of the apparatus with said exterior portion of the housing assembly directed and disposed for effective direct viewing and display of said visual representations, indicating means, and signal means by a group audience, said apparatus further comprising a component means cooperating with said other components for generating and selectively applying to each of a plurality of said components in said loop a continuous signal and an oscillatory signal which simulate a disturbance in the process being simulated.

2. The improved apparatus of claim 1 which comprises adjusting means cooperating with each of said computing components for selectively varying the electrical characteristics thereof, and manual actuating means for said adjusting means positioned on the exterior portion of said housing assembly adjacent the corresponding visual representation and indicating means of the component adjusted thereby.

References Cited

UNITED STATES PATENTS

| | | | |
|---|---|---|---|
| 2,470,434 | 5/1949 | Eckman et al. | 35—19.1 |
| 2,636,285 | 4/1953 | Fogarty et al. | 35—12 |
| 3,000,112 | 9/1961 | Crabb | 35—12 |
| 3,026,630 | 3/1962 | White et al. | 35—12 |
| 3,058,663 | 10/1962 | Barnard. | |
| 3,061,945 | 11/1962 | Hawkins | 35—13 |
| 3,082,546 | 3/1963 | Van Baerle | 35—10 |
| 3,146,533 | 9/1964 | Carmody et al. | 35—13 |
| 3,237,318 | 3/1966 | Schager | 35—13 |
| 3,309,793 | 3/1967 | Bartee | 35—10 |
| 3,310,883 | 3/1967 | Young | 35—10 |

EUGENE R. CAPOZIO, *Primary Examiner.*

W. W. NIELSEN, *Assistant Examiner.*